Figure 1:
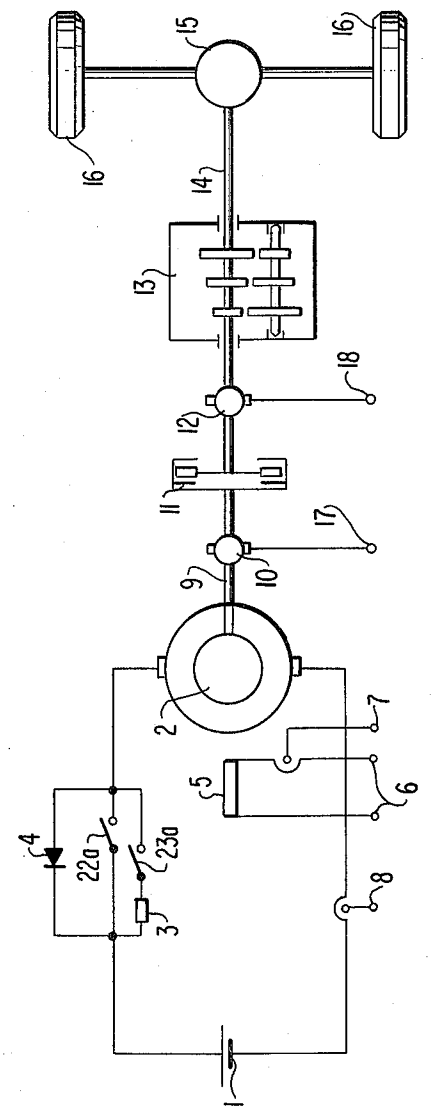

United States Patent [19]

Bader

[11] 3,984,742

[45] Oct. 5, 1976

[54] ELECTRIC MOTOR DRIVE FOR TRACKLESS VEHICLES

[75] Inventor: Christian Bader, Boblingen, Germany

[73] Assignee: Firma Deutsche Automobilgesellschaft mbH, Germany

[22] Filed: Apr. 23, 1975

[21] Appl. No.: 570,832

[30] Foreign Application Priority Data

Apr. 25, 1974 Germany ........................... 2419987

[52] U.S. Cl. ................................ 318/338; 318/139; 180/65 R; 192/.02 R; 74/866

[51] Int. Cl.[2] ............................................ H02P 5/06

[58] Field of Search ........... 318/338, 358, 359, 139; 74/866; 192/.02 R, .084; 180/65 R

[56] References Cited

UNITED STATES PATENTS

| | | | |
|---|---|---|---|
| 3,182,742 | 5/1965 | Don | 180/65 R |
| 3,628,621 | 12/1971 | Lee | 180/65 R |
| 3,755,724 | 8/1973 | Anderson | 318/139 |

*Primary Examiner*—Herman T. Hohauser
*Attorney, Agent, or Firm*—Craig & Antonelli

[57] ABSTRACT

A drive by means of an electric motor for trackless vehicles, in which the rotational speed adjustment takes place by changing the field energization of the electric motor, and with a separating clutch connected behind the motor as well as a change-speed transmission having at least two speeds in the foward driving direction; an energizing current controller for the field winding is provided whose energizing current-desired value is predetermined by another current controller to which are fed, on the one hand, the actual value of the armature current and, on the other, a desired value which is determined by the drive and/or brake pedal when the separating clutch is not actuated, and which is automatically determined by a synchronizing controller or is set to zero during the actuation of the separating clutch.

29 Claims, 2 Drawing Figures

ELECTRIC MOTOR DRIVE FOR TRACKLESS VEHICLES

The present invention relates to a drive intended for trackless vehicles, especially for street vehicles, by means of an electric motor in which the rotational speed adjustment takes place by weakening the field and with a separating clutch connected behind the motor as well as a change-speed gear with at least two speeds in the forward driving direction.

In a drive for a vehicle, it is desirable at all times that the full power of the driving motor can always be utilized at the driven axle independently of the speed of the vehicle. In a vehicle with an internal combustion engine which is able to produce about its full power output only within a limited rotational speed range, this is attained by a change-speed transmission connected behind the engine. During the shifting of the transmission speeds, the flow of power is interrupted by a mechanical separating clutch, the rotational speed equality at the corresponding gear pairs is brought about by way of mechanical synchronization installations and thereafter the flow of power between the engine and the driven axle is again re-established by engagement of the clutch. During the re-engagement of the clutch, the engine rotational speed has to change correspondingly which, however, means only a corresponding acceleration or deceleration of the inertia masses of the engine since the output produced by the internal combustion engine can be kept low during the shifting operation by closing the throttle valve.

A vehicle drive with an electric motor is more favorable insofar as the same is able to produce approximately a constant output over a rotational speed range of about 1 : 3 during the operation within the range of a weakened field. However, also this velocity range is still too small for the practical application and therebeyond, no operation in the starting range and at smaller velocities ($0 < V < V\max/3$) is possible therewith. This operating range is made possible in many known electric vehicles in that the voltage at the terminals of the motor is thereby reduced by a corresponding electronic power output control device. At least a constant driving torque can be produced therewith by the motor within this range.

This solution, however, is characterized by several disadvantages. On the one hand, only a constant torque is produced in the lower velocity range ($V < V\max/3$) and not an approximately constant output. On the other hand, the efficiency of the electronic output control in the armature circuit is considerably smaller than that of the mechanical change-speed transmission and finally also the costs of this transmission are considerably more favorable than those of the electronic output control. If one now couples an externally energized D.C. motor whose armature terminals are directly connected with the energy source and whose rotational speed adjustment can then take place only by changing the field excitation, i.e., by weakening the field to accelerate the motor, with a mechanical change-speed transmission by way of a separating clutch, then it is possible to achieve that over a wide velocity range which depends only on the number of transmission ratios or speeds, a constant output is effective at the driven wheels. However, special synchronization measures are required during the shifting of the transmission speeds or ratios since with a change of the mechanical transmission, also the excitation or energization of the electric motor has to be changed correspondingly. For in contradistinction to the internal combustion engine whose power output can be nearly interrupted by closing the throttle valve, in the electric motor which can be operated only in the weakened range of the field, the rotational speed is influenced only by way of the field excitation, and the electric motor would oppose itself to a rotational speed change which is forced upon it by the mechanical clutch during the change in speed with identical field excitation during the shifting, with a moment or torque whose magnitude depends only on the rotational speed difference as well as on the electric line and internal resistances of the armature circuit. Finally, with this arrangement there would also exist the danger that during the braking of the vehicle, the motor acts drivingly, if it had been omitted to timely interrupt the flow of power between the motor and the wheels by disengagement of the clutch, since the motor rotational speed cannot be decreased below a minimum value which is determined by the maximum energization and the voltage of the energy source.

It is the aim of the present invention to provide such a control arrangement for the drive in an electric vehicle equipped with a separating clutch and a change-speed gear which eliminates the described difficulties and therewith assures an orderly operation at all driving conditions.

The underlying problems are solved according to the present invention with the drives of the aforementioned type in that an energizing current controller is provided whose energizing-current desired value is predetermined by another current controller to which is fed, on the one hand, the actual value of the armature-current and, on the other, a desired value, which is determined with a non-actuated separating clutch by the drive pedal and the brake pedal and upon actuation of the separating clutch, automatically by a synchronizing controller or is set to zero.

The described disadvantages can be completely eliminated with the proposed arrangement. It becomes possible thereby to adapt during the actuation of the clutch the rotational speed of the electric motor automatically to the rotational speed occurring in the new speed or transmission ratio so that no shocks occur during the re-engagement of the clutch.

It is thereby proposed in detail that for purposes of determining the rotational speed between the motor and the separating clutch or between the separating clutch and the change-speed transmission, one rotational speed transmitter or pick-up each is provided which supply each an electrical output signal. According to the present invention, these output signals of the two rotational speed transmitters are subtracted from one another, and the difference is then fed to the synchronizing controller.

A further feature of the present invention resides in that one control member each, for example, a potentiometer for predetermining a desired-value for the driving current and braking current, respectively, corresponding to the pedal actuation is coordinated to the drive pedal and the brake pedal, and in that both desired values are adapted to be added with the correct sign. This applies, of course, both for the foot brake as also for the hand or parking brake. A switch opening during the braking is then advantageously coordinated thereby to the brake pedal which is connected in the energizing circuit of a relay connected in the circuit of the desired-driving-current. It is achieved in this manner that the desired-value for the braking-current receives priority with respect to the desired-value for the driving-current. It is additionally proposed by the present invention that a switch to be closed during disengagement of the clutch is arranged at the clutch pedal, which by means of a switching relay switches the desired-value input of the current controller from its connection with the control members at the pedals to the synchronizing controller or switches the same to zero. Appropriately, a blocking diode is arranged according to a further inventive proposal between the switches at the brake pedal and at the clutch pedal. It is achieved in this manner that only during the actuation of the clutch pedal, the two described relays will be energized and attract whereas this will not be the case during the actuation of the brake pedal. In the latter case, then only the relay coordinated to the brake pedal itself will be energized.

A further feature of the present invention resides in that a series resistance with an auxiliary switch is arranged in parallel to the main switch in the armature circuit of the motor. The relay of the main switch is thereby energizable by way of an auxiliary contact of the relay coordinated to the brake pedal by means of a trigger stage of conventional type which produces a signal, when the rotational speed of the motor exceeds a predetermined value. This value will appropriately lie by a predetermined factor below the idling rotational speed of the motor at full excitation, i.e., for example, at about 60 to about 80 percent thereof. Furthermore, it is additionally proposed that the relay of the auxiliary switch is adapted to be connected with the power supply by way of a further contact of the relay coordinated to the brake pedal.

Accordingly, it is an object of the present invention to provide a drive by the use of an electric motor for trackless vehicles which avoids by simple means the aforementioned shortcomings and drawbacks encountered in the prior art.

Another object of the present invention resides in an electric motor drive for trackless vehicles which optimizes the use of full power of the driving motor at the driven axle under all operating conditions.

A further object of the present invention resides in an electric motor drive which assures a favorable efficiency, low cost of the components and full power output over a relatively large speed range.

A still further object of the present invention resides in a drive with the use of an electric motor of the type described above which ensures an orderly operation under all driving conditions, yet permits a shifting of the speeds in a mechanical change-speed gear by the use of a clutch without the danger of shocks.

Still another object of the present invention resides in a drive for trackless vehicles, especially street vehicles, which is simple in construction, which utilizes an electric motor without the need of complicated electronic controls having low efficiency, and which permits the realization of favorable operating conditions at all speeds.

Figure 2:
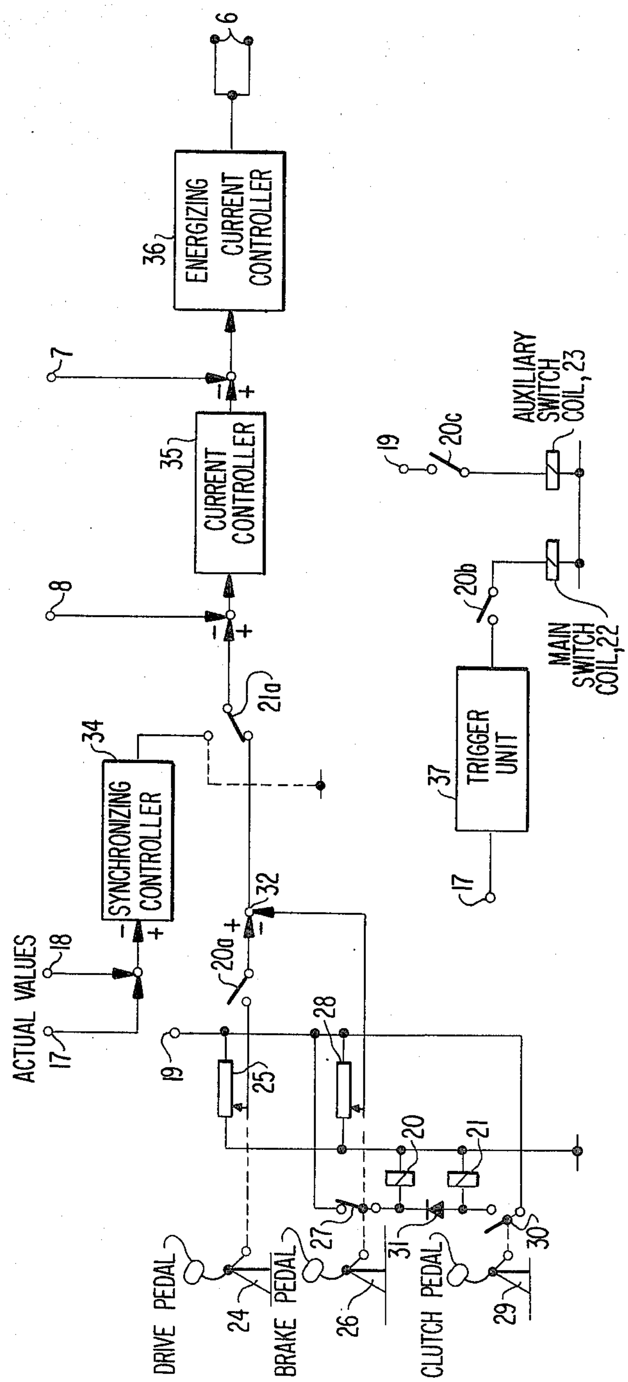

These and further objects, features and advantages of the present invention will become more apparent from the following description when taken in connection with the accompanying drawing which shows, for purposes of illustration only, one embodiment in accordance with the present invention, and wherein:

FIG. 1 is a schematic view of a vehicle drive in accordance with the present invention; and FIG. 2 is a schematic wiring and block diagram of the control system for the drive of FIG. 1.

Referring now to the drawing wherein like reference numerals are used throughout the two views to designate like parts, according to FIG. 1, the battery 1 supplies electrical energy to the armature terminals of a D.C. motor 2 of any conventional type by way of the contacts 22*a* (FIG. 1) of a main switch. The series circuit of a series resistance 3 together with the contacts 23*a* of an auxiliary switch, on the one hand, and the brake diode 4, on the other, are connected in parallel with the contacts 22*a*. The energizing field winding 5 of the electric motor 2 is supplied with electrical energy at the terminal 6 from the field control to be described more fully hereinafter. The actual-value of the field current is measured at the terminal 7 whereas the actual-value of the armature current is measured at the terminal 8 by conventional means. The electric motor 2 drives with its shaft 9, by way of a mechanical separating clutch 11, a change-speed transmission 13 whose output shaft 14 is connected by way of the axle gear 15 with the vehicle wheels 16. The rotational speed of the electric motor 2 and the input rotational speed of the change-speed transmission 13 or the rotational speed behind the clutch 11 are converted into suitable electrical signals in two transmitter devices, such as tachometer devices 10 and 12 of conventional type, whereby the signals are picked up at the points 17 and 18.

According to FIG. 2, a desired-value for the driving-current is predetermined by the driving pedal 24 by way of the potentiometer 25 which is fed at the terminal 19 from a fixed voltage. Similarly, a braking-current desired-value is predetermined by the brake pedal 26 by way of the potentiometer 28, whereby this predetermination takes place in a similar manner by the foot brake as also by the hand brake and the parking brake. During the actuation of the brake, the switch 27 is simultaneously opened whereby the relay 21 is de-energized and drops off. The desired-values are added in their correct sign at the point 32 by conventional means whereby a priority of the braking current predetermination with respect to the driving-current is assured by the contact 20*a* of the relay 20. On the one hand, the mechanical clutch 11 is disengaged by means of the clutch pedal 29 by a conventional connection (not shown) and on the other, during the actuation of the clutch 11, the contact 30 is closed so that the relay 21 and simultaneously also the relay 20 are energized by way of the diode 31 and attract their armatures thereby closing the corresponding switches.

The actual-values of the two rotational speeds in front of and to the rear of the mechanical clutch 11 which are supplied at the terminals 17 and 18, are subtracted from one another by conventional means and the difference is fed to a synchronizing control device 34 of conventional, known construction. This control device 34 advantageously exhibits an integral behavior according to the present invention, whereby it can be assured by a further contact (not shown) of the relay 21 that the starting value of the output voltage of the controller 34 is always zero during the actuation of the clutch 11 which corresponds to the fact that at this moment the two rotational speeds in front of and to the rear of the clutch are in agreement, i.e., are equal.

The output of the control device 34 as well as the desired-current-values combined in point 32 are fed to a shifting switch 21*a* which continues to transmit the desired-current-values predetermined at the driving and brake pedal as long as the clutch 11 has not been actuated. If the clutch 11 is actuated by depressing the clutch pedal 29, then the relay 21 is energized and shifts the contact 21*a* so that the desired-value for the armature current is now predetermined only by the control device 34. This desired-value is fed together with the actual-value of the armature current supplied at the terminal 8 to the current control device 35 of conventional, known construction, which drives therefrom a desired-value for the field energizing current. Together with the actual-value of the energizing current at the terminal 7, the energizing current control device 36 of conventional construction therewith influences the energizing winding connected to the terminal 6 in a suitable manner.

Additionally, a conventional trigger stage 37 is connected to the terminal 17, at which is available an electric signal corresponding to the rotational speed of the electric motor, which produces a signal when the motor rotational speed exceeds approximately the value $k \cdot n_o$. In that connection, $n_o$ thereby designates the idling rotational speed of the motor at full excitation whereas $k$ has a value smaller than 1, approximately $k =$ about 0.6 to about 0.8. The coil of the main switch 22 is energized from the trigger stage 37 by way of the contact 20*b* of the relay 20, whose contact 22*a* (FIG. 1) connects the armature terminals of the motor with the battery. The coil of the auxiliary switch 23 is connected by way of the contact 20*c* of the relay 20 with the supply voltage existing at the terminal 19. The contact 23*a* (FIG. 1) of this auxiliary switch 23 connects the armature terminals of the motor with the battery by way of the series resistance 3.

OPERATION

The operation is as follows:

When turning on the ignition key, the supply voltage is applied to the terminal 19. As long as a brake continues to be engaged or actuated, the coils 22 and 23 are de-energized so that the electric motor cannot be fed from the battery. If the brake is released, then the relay 20 will be energized, and the contacts 20*a*, 20*b* and 20*c* will close by attraction of the armature of the relay 20. As a result thereof, the motor is at first connected with the battery by way of the series resistance 3. The resistance 3 is appropriately selected so large that during standstill of the motor, the armature current is limited to about one to two times the value of the rated current. As soon as the motor has approximately reached its rated rotational speed, which requires about one second, the resistance 3 is short-circuited by the contacts 22*a* of the main switch 22 as a result of the operation of the trigger unit 37. With a depressed clutch, causing energization of relay coils 20 and 21 due to closing of switch 30, the first speed can now be engaged and the vehicle can now be brought by way of the clutch 11 to its minimum velocity which is determined by the idling rotational speed of the motor at full excitation and the transmission ratio of the first speed. For the further acceleration, a predetermined desired-value of the armature current is predetermined by means of the drive pedal 24 which effects a corresponding weakening of the field energizing current by way of the current control device 35 and the energizing current control device 36.

If now the clutch 11 is again depressed for shifting into the next higher speed, then the synchronizing control device 34 becomes operable, which with a separated clutch 11 predetermines by way of the contact 21*a* of the shifting relay 21 such a desired-value of the armature current that the motor rotational speed will adapt itself to the rotational speed which in a given case occurs behind the clutch. During the shifting into a higher speed, a braking-current desired-value is predetermined therefore by the synchronizing control device 34 for the armature current and correspondingly when shifting back into a lower speed, a driving-current desired-value is predetermined. The diode 31 (FIG. 2) thereby effects that during the actuation of the brake pedal 26 during which normally no driving-current can flow by reason of the de-energization of the relay 20 and of the opening of the contacts 22*a* and 23*a* connected therewith, these contacts 22*a* and 23*a* are closed again with the simultaneous actuation of the clutch in order to be able tc accelerate the motor to the rotational speed corresponding to the next lower transmission speed when shifting back.

Finally, it is assured by the opening of the contacts 22*a* and 23*a*, when touching the brake pedal 29, that the armature current can flow only as braking current so that when falling below the minimum rotational speed of the electric motor without depressed clutch, the motor cannot still be acting additionally in a driving manner.

Non-permissively high motor currents which might occur during a somewhat sudden engagement of the clutch when starting, are precluded by the trigger stage 37 which opens the contacts 22*a* when the motor rotational speed drops below the value $k \cdot n_o$ whereby the motor current is then limited to non-dangerous values by the series-resistance 3.

It is indicated in FIG. 2 by the dash line at the switching contact 21*a* that in more simple constructions, it may also be adequate to predetermine during the actuation of the clutch the desired value "zero" for the armature current. As a result thereof, the measurement of the two rotational speeds by means of the tachometers 10 and 12 as well as the synchronizing controller 34 can then be dispensed with. The electric motor will then be so guided by the control system during the change in speed that it does not produce any moment, i.e., that it acts neither drivingly nor brakingly. This can be readily achieved by conventional control means, known in the art and forming no part of the present invention. Exclusively a moment has to be then transmitted during the re-engagement of the clutch 11 which serves for the acceleration or deceleration of the motor inertia masses corresponding to the rotational speed difference which has resulted during the change in speed.

Finally, it is also apparent that the actuation of the clutch can take place by eliminating the clutch pedal, also by way of a corresponding contact which is combined with the shifting lever for the transmission without causing any change in the described operation.

Since those elements shown in block diagram are of conventional construction involving conventional components forming no part of the present invention, a detailed description thereof is dispensed with herein.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A drive arrangement with the use of an electric motor having an armature and a field winding for trackless vehicles, in which the rotational speed adjustment takes place by varying the field energization of the motor and which includes a separating clutch means connected behind the motor as well as a change-speed transmission means having at least two speeds in the forward driving direction, characterized in that a first field energizing current control means controlling the energization of the field winding is provided, a second current control means producing the desired value of the field energizing current is operatively connected with its output to the input of the first current control means, said second current control means having two inputs to which are applied, on the one hand, the actual value of the armature current and, on the other, a desired value for the armature current, and means including selectively operable means for determining the desired value of the armature current with a non-actuated separating clutch means and automatic means for automatically controlling the desired value of the armature current when the separating clutch means is actuated.

2. A drive arrangement according to claim 1, characterized in that selectively operable means includes a drive pedal and a brake pedal.

3. A drive arrangement according to claim 2, characterized in that the automatic means includes a synchronizing control means.

4. A drive arrangement according to claim 2, characterized in that the automatic means is operable to set the desired value for the armature current to zero during actuation of the separating clutch means.

5. A drive arrangement according to claim 2, characterized in that for purposes of determining the rotational speed difference between the input of the separating clutch means and the output thereof, one rotational speed transmitter means each is provided producing electrical output signals corresponding to the respective rotational speeds.

6. A drive arrangement according to claim 5, characterized in that the automatic means includes a synchronizing control means.

7. A drive arrangement according to claim 6, characterized in that the output signals of the two rotational speed transmitter means are subtracted from one another and the difference is adapted to be fed to a synchronizing control means.

8. A drive arragement according to claim 7, characterized in that one control member each is coordinated to the drive pedal and the brake pedal for predetermining a desired value for the driving current and braking current corresponding to the pedal actuation, and means for adding the two desired values in their respective signs.

9. A drive arrangement according to claim 8, characterized in that a first switch means opening during braking is coordinated to the brake pedal which is connected in the energizing circuit of a first relay means connected in the circuit of the desired driving current.

10. A drive arrangement according to claim 9, characterized in that a second switch means is arranged at the clutch pedal which is to be closed during disengagement of the clutch means, said second switch means being operable to shift the desired value input of the second current conrol means from its connection with the control members at the pedals to the synchronizing control means.

11. A drive arrangement according to claim 10, characterized in that a second switch means is arranged at the clutch pedal which is to be closed during disengagement of the clutch means, said second switch means being operable to switch the desired value input of the second current control means from its connection with the control members to zero.

12. A drive arrangement according to claim 10, characterized in that the second switch means is operable to carry out the switching function by means of a switching relay means.

13. A drive arrangement according to claim 11, characterized in that the control members are potentiometers.

14. A drive arrangement according to claim 10, characterized by a blocking diode between the first and second switch means at the brake pedal and at the clutch pedal.

15. A drive arrangement according to claim 14, characterized in that a resistance is arranged in a series circuit together with an auxiliary switch means in parallel to a main switch means connected in the armature circuit of the motor.

16. A drive arrangement according to claim 15, characterized in that the relay means of the main switch means is energizable by way of an auxiliary contact of the relay means coordinated to the brake pedal by way of a trigger means which produces a signal when the motor rotational speed exceeds a predetermined limit value.

17. A drive arrangement according to claim 16, characterized in that the relay means of the auxiliary switch means is adapted to be connected with the supply voltage by way of a further contact means of the relay means coordinated to the brake pedal.

18. A drive arrangement according to claim 1, characterized in that for purposes of determining the rotational speed difference between the input of the separating clutch means and the output thereof, one rotational speed transmitter means each is provided producing electrical output signals corresponding to the respective rotational speeds.

19. A drive arrangement according to claim 18, characterized in that the output signals of the two rotational speed transmitter means are subtracted from one another and the difference is adapted to be fed to a synchronizing control means.

20. A drive arrangement according to claim 2, characterized in that one control member each is coordinated to the drive pedal and the brake pedal for predetermining a desired value for the driving curent and braking current corresponding to the pedal actuation, and means for adding the two desired values in their respective signs.

21. A drive arrangement according to claim 20, characterized in that a first switch means opening during braking is coordinated to the brake pedal which is connected in the energizing circuit of a first relay means connected in the circuit of the desired driving current.

22. A drive arrangement according to claim 21, characterized in that a second switch means is arranged at the clutch pedal which is to be closed during disengagement of the clutch means, said second switch means being operable to shift the desired value input of the second current control means from its connection with the control members at the pedals to the synchronizing control means.

23. A drive arrangement according to claim 21, characterized in that a second switch means is arranged at the clutch pedal which is to be closed during disengagement of the clutch means, said second switch means being operable to switch the desired value input of the second current control means from its connection with the control members to zero.

24. A drive arrangement according to claim 20, characterized in that the control members are potentiometers.

25. A drive arrangement according to claim 21, characterized in that a second switch means is arranged at the clutch pedal which is to be closed during disengagement of the clutch means, said second switch means being operable to shift the desired value input of the second current control means from its connection with the control members at the pedals.

26. A drive arrangement according to claim 25, characterized by a blocking diode between the first and second switch means at the brake pedal and at the clutch pedal.

27. A drive arrangement according to claim 2, characterized in that a resistance is arranged in a series circuit together with an auxiliary switch means in parallel to a main switch means connected in the armature circuit of the motor.

28. A drive arrangement according to claim 27, characterized in that the relay means of the main switch means is energizable by way of an auxiliary contact of the relay means coordinated to the brake pedal by way of a trigger means which produces a signal when the motor rotational speed exceeds a predetermined limit value.

29. A drive arrangement according to claim 28, characterized in that the relay means of the auxiliary switch means is adapted to be connected with the supply voltage by way of a further contact means of the relay means coordinated to the brake pedal.

* * * * *